United States Patent
Park et al.

(10) Patent No.: US 9,415,733 B2
(45) Date of Patent: Aug. 16, 2016

(54) VEHICLE MANIPULATING SYSTEM USING SOUND WAVES

(71) Applicant: Hyundai Motor Company, Seoul (KR)

(72) Inventors: Sung Min Park, Seoul (KR); Hui Sung Lee, Gunpo-si (KR); Kwang Myung Oh, Daejeon (KR); Sung Jin Sah, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 142 days.

(21) Appl. No.: 14/095,506

(22) Filed: Dec. 3, 2013

(65) Prior Publication Data

US 2014/0379172 A1 Dec. 25, 2014

(30) Foreign Application Priority Data

Jun. 24, 2013 (KR) .................. 10-2013-0072241

(51) Int. Cl.
*B60R 16/023* (2006.01)
*B60R 16/037* (2006.01)

(52) U.S. Cl.
CPC ........... *B60R 16/0373* (2013.01); *B60R 16/023* (2013.01); *B60R 16/0231* (2013.01)

(58) Field of Classification Search
CPC ............ B60R 16/0373; B60R 16/0231; B60R 16/023; G06F 3/041; G06F 3/0416
USPC ............................. 701/1–2, 36; 345/173–184
See application file for complete search history.

(56) References Cited

U.S. PATENT DOCUMENTS

| | | | |
|---|---|---|---|
| 8,751,065 B1 * | 6/2014 | Kato | 701/2 |
| 2005/0188821 A1 | 9/2005 | Yamashita et al. | |
| 2011/0316664 A1 * | 12/2011 | Olcott et al. | 340/4.37 |
| 2014/0098028 A1 * | 4/2014 | Kwak | G06F 3/041 345/173 |

FOREIGN PATENT DOCUMENTS

| | | |
|---|---|---|
| JP | 2579638 B2 | 2/1997 |
| JP | 2005227628 A | 8/2005 |
| JP | 2006-081091 A | 3/2006 |
| KR | 10-0856919 B1 | 9/2008 |
| KR | 20100042826 A | 4/2010 |
| KR | 10-2012-0024218 A | 3/2012 |
| KR | 10-2012-0090148 A | 8/2012 |

* cited by examiner

*Primary Examiner* — Nga X Nguyen
(74) *Attorney, Agent, or Firm* — McDermott Will & Emery LLP

(57) ABSTRACT

A vehicle manipulating system using sound waves includes a friction pad, and a sound wave generation film that generates film sound waves when adhered to the friction pad and moved. A smartphone is configured to control devices in a vehicle using the sound waves generated by the sound wave generation film, in order to control various devices in the vehicle while driving.

3 Claims, 2 Drawing Sheets

VEHICLE MANIPULATING SYSTEM USING SOUND WAVES

CROSS-REFERENCE TO RELATED APPLICATION

This application is based on and claims the benefit of priority to Korean Patent Application No. 10-2013-0072241, filed on Jun. 24, 2013 in the Korean Intellectual Property Office, the disclosure of which is incorporated herein in its entirety by reference.

TECHNICAL FIELD

The present disclosure relates to a vehicle manipulating system using sound waves, and more particularly, to a technology of manipulating various devices in a vehicle by the sound waves generated by a driver.

BACKGROUND

As smartphones have recently come into wide use, a technology of manipulating various devices in a vehicle using the smartphone is actively emerging.

According to a technology of starting the vehicle using the smartphone, as an example, if a driver executes a control application through a touch screen, selects a device to be manipulated, and inputs corresponding control instruction, the smartphone communicates with a control system mounted on the vehicle to transmit the control instruction, and the control system performs the control instruction, thereby starting the vehicle.

As another example, according to a technology of opening and closing a window of the vehicle using the smartphone, if the driver executes the control application through the touch screen, selects the device to manipulate, and inputs corresponding control instruction, the smartphone communicates with the control system mounted in the vehicle to transmit the control instruction, and the control system performs the control instruction, thereby opening and closing the window.

For the vehicle manipulating system according to the related art as described above, the driver has to perform a series of operations one by one to perform the control while looking at the touch screen in order to manipulate various devices in the vehicle. As a result, it may be inconvenient to use the above-mentioned vehicle manipulating system while driving.

Particularly, in the present situation in which various behaviors (e.g., manipulation of smartphones, and the like) distracting the driver's attention while driving are subject to legal penalty, it is impossible to use the above-mentioned vehicle manipulating system.

SUMMARY

The present disclosure has been made to solve the above-mentioned problems occurring in the prior art while advantages achieved by the prior art are maintained intact.

An aspect of the present disclosure provides a vehicle manipulating system using sound waves capable of controlling various devices in a vehicle while driving by analyzing the sound waves generated by a driver to transmit a control signal corresponding to the sound waves to a vehicle control system.

Exemplary embodiments of the present disclosure are not limited to the above-mentioned aspect, and other aspects and advantages of the present disclosure which are not mentioned can be appreciated by the following description and will be clearly described by exemplary embodiments of the present disclosure. In addition, it will be clear from the present disclosure that subjects and advantages of the present disclosure can be implemented by means and a combination thereof shown in the appended claims.

According to an exemplary embodiment of the present disclosure, a vehicle manipulating system using sound waves includes a friction pad, and a sound wave generation film that generates film sound waves when adhered to the friction pad and moved. A smartphone is configured to control devices in a vehicle using the sound waves generated by the sound wave generation film.

The smartphone may include a storage storing device information corresponding to each sound wave, and a microphone receiving sound waves generated from the outside. A controller is configured to determine a device corresponding to the sound wave received through the microphone based on the device information corresponding to each sound wave and then generate a corresponding control signal. A communicator transmits the control signal to a control system of the vehicle.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

The above objects, features, and advantages will be apparent by a detailed description described below with reference to the accompanying drawings, and therefore, the technical ideas of the present disclosure can be practiced by a person with ordinary skill in the art to which the present disclosure pertains. In addition, in describing the present disclosure, when the detailed description of a well-known technology relating to the present disclosure may unnecessarily obscure the spirit of the present disclosure, the detailed description thereof will be omitted. Hereinafter, exemplary embodiments of the present disclosure will be described in detail with reference to the accompanying drawings.

Figure 1:
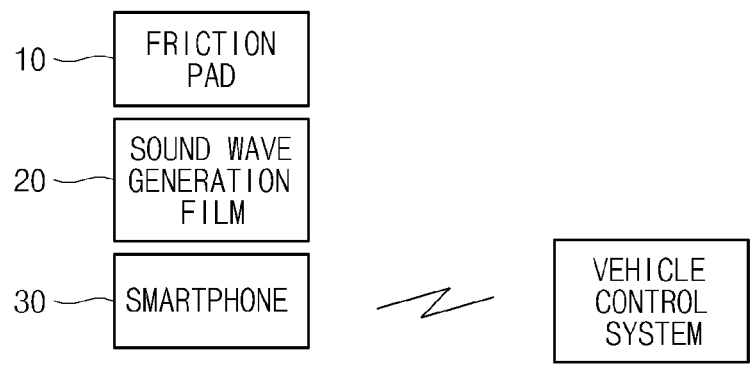
FIG. 1 is a configuration diagram of a vehicle manipulating system using sound waves according to an exemplary embodiment of the present disclosure.

FIG. 1 is a configuration diagram of a vehicle manipulating system using sound waves according to an exemplary embodiment of the present disclosure.

As shown in FIG. 1, the vehicle manipulating system using the sound waves according to an exemplary embodiment of the present disclosure includes a friction pad 10, a sound wave generation film 20, and a smartphone 30.

The above-mentioned respective components will be described. First, the friction pad 10, which is a bracket having the sound wave generation film 20 adhered thereto, induces sound wave generation by the sound wave generation film 20. Particularly, the friction pad 10 may be disposed at a center console of a vehicle to enable the driver to easily generate the sound waves even in a state in which the driver keeps his/her eyes forward while driving. The friction pad 10 may be mounted on a desired position depending on preference of the driver.

For reference, the friction pad 10 has a flat surface having a predetermined friction force, and a material thereof is not particularly limited. Particularly, the surface of the friction pad 10 may generate uniform sound waves by having a plurality of squares having low elasticity and formed of fine square grooves.

The sound wave generation film 20 is a film having a specific pattern carved thereon, and when adhered to the sound wave generation pad 10 and moved by the driver, it generates different sound waves depending on a moving direction (e.g., left/right/upward/downward).

The above-mentioned sound wave generation film 20 may be attached to the back of the smartphone 30 (a surface opposite to a display) to receive, through a microphone of the smartphone 30, the sound waves that the sound wave generation film 20 adhered to the friction pad 10 generates while moving.

The sound wave generation film 20 may be implemented as a smartphone cover having the specific pattern carved thereon.

Next, the smartphone 30 is installed with an application for manipulating various devices in the vehicle. The driver executes the application and performs a series of operations for manipulating various devices in the vehicle. Here, examples of various devices in the vehicle include a window, a sunroof, an air conditioner, a heater, and the like.

That is, the driver adheres the sound wave generation film 20 attached to the smartphone 30 to the friction pad 10 and moves toward a particular direction, thereby generating the sound wave corresponding to the device to be manipulated. For example, a movement toward a left side generates the sound wave corresponding to the air conditioner, a movement toward a right side generates the sound wave corresponding to the heater, and a movement toward a downward direction generates the sound wave corresponding to the sunroof.

Then, the smartphone 30 receives the sound waves through the embedded microphone and analyzes the received sound waves to determine what device is to be manipulated. That is, the smartphone 30 matches the particular sound wave and a particular device to each other at one-to-one and stores it. Therefore, if the sound wave is analyzed, the device corresponding to the sound wave may be recognized.

In addition, the smartphone 30 waits for the sound wave for manipulating the particular device to be received after the particular device is selected. In this case, the sound wave is a sound generated by a behavior tapping on a front glass of the smartphone using a finger. As an example, a sound generated by tapping on a front glass once means 'ON,' and a sound generated by tapping on the front glass twice means 'OFF'. As another example, the sound generated by tapping on the front glass once may be 'DOWN,' and the sound generated by continuously tapping on the front glass twice may be 'UP'.

For reference, the sound wave generated by tapping on the front glass of the smartphone 30 using the finger may be slightly different for everybody, but is limited to a particular range. Therefore, the vehicle manipulating system may be implemented so that all the tapping sounds generated in the particular range may be recognized.

Figure 2:
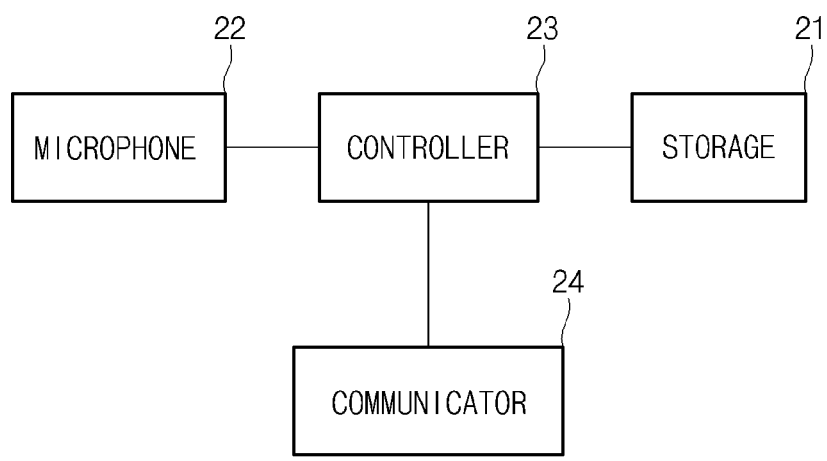
FIG. 2 is a configuration diagram of a smartphone for a vehicle manipulation using the sound waves according to an exemplary embodiment of the present disclosure.

FIG. 2 is a configuration diagram of a smartphone for a vehicle manipulation using the sound waves according to an exemplary embodiment of the present disclosure.

As shown in FIG. 2, the smartphone for the vehicle manipulation using the sound waves according to an exemplary embodiment of the present disclosure includes a storage 21, a microphone 22, a controller 23, and a communicator 24.

The above-mentioned respective components will be described. First, the storage 21 stores device information corresponding to each sound wave.

The microphone 22 receives the sound waves generated from the outside. The controller 23 determines the devices corresponding to the sound wave received through the microphone 22 based on the device information corresponding to each sound wave stored in the storage 21 and generates a control signal for controlling the corresponding device.

The communicator 24 transmits the control signal to a control system of the vehicle under control of the controller 23. Then, the control system of the vehicle controls the corresponding device based on the control signal.

As set forth above, according to the exemplary embodiment of the present disclosure, various devices in the vehicle may be easily controlled while driving by analyzing the sound waves generated by the driver to transmit the control signal corresponding to the sound waves to the vehicle control system.

The present disclosure described above may be variously substituted, altered, and modified by those skilled in the art to which the present disclosure pertains without departing from the scope and spirit of the present disclosure. Therefore, the present disclosure is not limited to the above-mentioned exemplary embodiments and the accompanying drawings.

What is claimed is:

1. A vehicle manipulating system using sound waves, comprising:
   a friction pad mounted inside a vehicle;
   a sound wave generation film generating sound waves when the sound wave generation film is adhered to the friction pad and is moved by a driver;
   a smartphone configured to control devices in the vehicle using the sound waves which are generated by the sound wave generation film;
   wherein the sound wave generation film has a pattern carved thereon to generate the sound waves by friction with the friction pad;
   wherein the sound wave generation film is attached on a back of the smartphone.

2. The vehicle manipulating system using sound waves according to claim 1, wherein the friction pad is attached to a hand reach zone including a center console of the vehicle.

3. The vehicle manipulating system using sound waves according to claim 1, wherein the smartphone includes:
   a storage configured to store device information corresponding to each sound wave;
   a microphone configured to receive a sound wave generated from outside;
   a controller configured to determine a device corresponding to the sound wave received through the microphone based on the device information corresponding to each sound wave and then to generate a corresponding control signal; and
   a communicator configured to transmit the control signal to a control system of the vehicle.

\* \* \* \* \*